United States Patent [19]

Musch et al.

[11] Patent Number: 4,857,616

[45] Date of Patent: Aug. 15, 1989

[54] PROCESS FOR THE PREPARATION OF POLYCHLOROPRENE

[75] Inventors: Rüdiger Musch, Bergisch-Gladbach; Eberhard Müller, Dormagen; Gerhard Hohmann, Leverkusen; Karl-Heinz Schabel, Burscheid, all of Fed. Rep. of Germany

[73] Assignee: Bayer Aktiengesellschaft, Bayerwerk, Fed. Rep. of Germany

[21] Appl. No.: 154,936

[22] Filed: Feb. 11, 1988

Related U.S. Application Data

[63] Continuation-in-part of Ser. No. 12,362, Feb. 9, 1987, abandoned.

[30] Foreign Application Priority Data

Feb. 19, 1986 [DE] Fed. Rep. of Germany ....... 3605333

[51] Int. Cl.$^4$ ............................. C08F 2/38; C08F 2/24
[52] U.S. Cl. .................................... 526/204; 526/223; 526/295
[58] Field of Search ............... 526/204, 223, 220

[56] References Cited

U.S. PATENT DOCUMENTS

| | | | |
|---|---|---|---|
| 2,234,215 | 3/1941 | Youker | 526/295 |
| 3,318,832 | 5/1967 | Sparks | 526/295 |
| 3,926,912 | 12/1975 | Mayer-Mader | 526/223 |
| 3,984,384 | 10/1976 | Mayer-Mader | 526/223 |
| 4,180,638 | 12/1979 | Dollhausen | 526/204 |

FOREIGN PATENT DOCUMENTS

649104 1/1951 United Kingdom .
1404766 9/1975 United Kingdom .

*Primary Examiner*—Christopher Henderson
*Attorney, Agent, or Firm*—Connolly & Hutz

[57] ABSTRACT

Storage-stable polychloroprene is obtained, by aqueous emulsion polymerization, using xanthogen disulphides as molecular weight regulators, when a peptizing agent is added after the end of the polymerization.

2 Claims, No Drawings

PROCESS FOR THE PREPARATION OF POLYCHLOROPRENE

This is a continuation-in-part application of parent application Ser. No. 12 362, filed Feb. 9, 1987, now abandoned.

The invention relates to a process for the preparation of polychloroprene using xanthogen disulphides as molecular weight regulators.

It is known that the polymerization of chloroprene can be carried out using xanthogen disulphides as molecular weight regulators (chain transfer agents). In this fashion, products are obtained which display a more favorable vulcanization behaviour compared to the polymers regulated using mercaptans and which lead to vulcanized materials having higher tensile strength.

One disadvantage of the use of xanthogen disulphides is the increase of the Mooney viscosity during storage of the unvulcanized rubber. Compared to the earlier known xanthogen disulphides, for example from DE-OS (German Published Specification) No. 2,306,610, the compounds obtained according to EP-OS (European Published Specification) No. 53,319 and which are distinguished by a particularly low content of elementary sulphur have led to improvements in this respect, but which are not yet adequate.

It has now been found that storage-stable polychloroprenes can be prepared by aqueous emulsion polymerization using xanthogen disulphides as molecular weight regulators when a peptizing agent is added after the end of the polymerization.

The invention therefore relates to a process for the preparation of polychloroprene by aqueous emulsion polymerization of chloroprene and from 0 to 20% by weight, based on the total quantity of monomers to be polymerized, of monomers copolymerizable with chloroprene, in the presence of an effective amount of polymerization initiator and from 0.3 to 5 mmol per 100 g of monomers of xanthogen disulphide corresponding to the formula

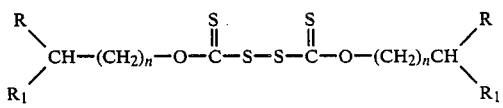

in which n denotes 0 to 4,

R and $R_1$, independently of one another, denote hydrogen, $C_1$-$C_6$-alkyl, $C_5$-$C_8$-cycloalkyl or, together with the CH group, denote an oxygen-containing heterocyclic ring system having 5-8 ring members, which is unsubstituted, mono-, di- or trisubstituted by $C_1$-$C_4$-alkyl, with the proviso that the xanthogen disulphide contains less than 2% by weight, based on xanthogen disulphide, of free sulphur as the single sulphur source, and working up the polymer suspension to the solid rubber, characterized in that from $2 \times 10^{-5}$ to $3 \times 10^{-3}$ mol per 100 g of monomers of peptizing agent is added after the end of the polymerization.

Preferred xanthogen disulphides embrace particularly those of EP-A (European Published Specification) No. 53,319 (incorporated herein by reference) having a content of free sulphur of less than 2% by weight, based on xanthogen disulphide.

Examples are dimethylxanthogen disulphide, diethylxanthogen disulphide, dipropylxanthogen disulphide, dibutylxanthogen disulphide, dicyclohexylxanthogen disulphide, bis-(1,3-dioxolan-4-yl-methyl)-xanthogen disulphide, bis-(5-ethyl-1,3-dioxan-5-yl-methylxanthogen disulphide (MTX) and diisopropylxanthogen disulphide.

Preferred polymerization initiators are formamidinesulphinic acid, potassium peroxodisulphate, mixtures of formamidinesulphinic acid and potassium peroxodisulphate, mixtures of potassium peroxodisulphate and sodium β-anthraquinonesulphonate, or mixtures of formamidinesulphinic acid, potassium peroxodisulphate and sodium β-anthraquinonesulphonate, and also combinations of the above-mentioned initiatiors and initiator mixtures with sodium dithionite, or sodium dithionite alone.

The polymerization temperature is, in particular, 0° to 60° C.

Preferred peptizing agents are tetraalkylthiuram disulphides, alone or in combination with substances which act nucleophilically, such as amines, mercaptobenzothiazoles or diaryl polysulphides. The alkyl groups of the tetraalkylthiuram disulphides preferably carry 1-4 C atoms, tetraethylthiuram disulphide being particularly preferred.

Preferred comonomers have at least one, preferably one or two, ethylenical unsaturations and have from 2 to 12, preferably from 2 to 6 carbon atoms.

Suitable comonomers are, for example, acrylonitrile, methacrylonitrile, acrylates, methacrylates, vinylidene chloride, styrene, vinyltoluenes, (1,3)-butadiene, 1-chloro-(1,3)-butadiene, 2,3-dichloro-(1,3)-butadiene and 2-chloro-3-methyl-(1,3)-butadiene, 2,3-dichloro-(1,3)-butadiene being preferred. The comonomers do not embrace sulphur.

For the production of crosslinked products, suitable comonomers are, in particular, alkylene glycols which have been diesterified with (meth)acrylic acid, for example ethylene glycol dimethacrylate.

The peptizing agents are preferably employed in an amount from $10^{-4}$ to $1 \times 5 \times 10^{-3}$ mol per 100 g of monomers.

Relative to the monomers to be polymerized, 0.01 to 0.3% by weight of sodium dithionite are preferably employed.

If mixtures containing sodium dithionite are employed as polymerization initiator, then the weight ratio of the conventional initiators to sodium dithionite extends from (0.05-5):1, preferably (0.1-3):1 parts by weight.

If a mixture of FAS and potassium peroxodisulphate is used as conventional initiators, then their weight ratio to one another is from (1:10) to (10:1) parts by weight. If a mixture of potassium peroxodisulphate and sodium β-anthraquinonesulphonate is used, then these components can be employed in the weight ratio as quoted by U.S. patent specification No. 2,426,854. The weight ratio of FAS/potassium peroxidisulphate and sodium β-anthraquinonesulphonate can be varied within the range of values in DE-OS (German Published specification) No. 2,650,342, incorporated herein by reference.

It is not usually necessary to use comonomers in the preparation of basic materials for adhesives. However, where comonomers are used, 2,3-dichlorobutadiene is the preferred comonomer in the preparation of basic materials for rubbers, and ethylene glycol dimethacrylate is the preferred cross-linking comonomer.

EXAMPLES

Preparation of xanthogen disulphides
(a) Bis-(5-ethyl-1,3-dioxan-5-yl-methyl)-xanthogen disulphide (MTX)

The preparation is carried out by the methods described in DE-OS (German Published Specification) No. 2,306,610, Example 5.

A yellowish product is obtained.

M.p.: 42°–46° C.

Sulphur content: 4.6%.

The sulphur content is determined by the HPLC method described in EP-OS (European Published Specification) No. 53,319.

(b) MTX preparation by the method described in EP-OS (European Published Specification) No. 53,319, Example 3.

An almost colourless product is obtained.

M.P.: 51°–53° C.

The peptizing agent can be added before or after the removal of remaining monomers from the polymer latex; preferably, it is added before separating off the polymer from aqueous suspension.

The latex is preferably worked up to the solid rubber by known methods of freeze coagulation.

The polychloroprene obtained by the process according to the invention is suitable for the production of adhesives and rubber articles. The increase in viscosity during storage is avoided by the addition of the peptizing agent, but the vulcanized materials nevertheless have the known high tensile strength.

Sulphur content: 0.6%

(c) Diethylxanthogen disulphide

The product is prepared according to EP-OS (European Published Specification) No. 53,319, Example 5.

M.p.: 22°–24° C.

Sulphur content: 0.95%.

EXAMPLE 1

10 kg of chloroprene are emulsified in 15 kg of water to which 550 g of disproportionated abiatic acid (solids content 70% by weight), 50 g of the sodium salt of a naphthalenesulphonic acid/formaldehyde condensation product, 60 g of sodium hydroxide, 35 g of MTX according to method (a) and 10 g of potassium peroxodisulphate are added. A 3% by weight aqueous formamidine-sulphinic acid solution is used as catalyst solution.

The emulsion is purged with nitrogen, heated to 40° C., and initiated by addition of catalyst solution.

Further catalyst solution is introduced during the polymerization at such a rate that the temperature of the batch does not exceed 45° C. After monomer conversions of 28 and 55%, a further 17.5 g of MTX according to method (a) are introduced in each case, the polymerization is terminated after a monomer conversion of 70% by addition of 12 g of pyrocatechol, and the excess monomer is separated off at reduced pressure by steam distillation.

The pH of the latex is reduced to 6.5 and the polymer is frozen out on a chill mill and dried. The Mooney viscosity (M1-4') of the polymer is 73 ME.

EXAMPLE 2

The procedure as in Example 1 is carried out, but 30 g of MTX according to method (b) are metered in before the commencement of polymerization and 15 g in each case are metered in at 30% and 57% monomer conversion. The Mooney viscosity of the polymer is 76 ME.

EXAMPLE 3

The procedure as in Example 1 is carried out, but 19 g of diethylxanthogen disulphide according to method (c) are added before the commencement of polymerization and 9.5 g in each case are added at 30% and 54% monomer conversion. The Mooney viscosity of the polymer is 70 ME.

EXAMPLE 4

The polymerization is carried out as in Examples 1 to 3, but tetraethylthiuram disulphide (TETD) and dibutylamine (nDBA) are added to the terminated latex before or after degassing of the monomers. The added amounts can be seen from Table 1. The petization and work-up is carried out analogously to DE-OS (German Published Specification) No. 2,018,736. Ageing behaviour of the raw polymer.

The viscosity of the fresh polymer and of the polymer aged at 70° C. in the drying stove is determined according to Mooney (DIN 53 523). The more stable the products are, the less is the viscosity difference ($\Delta$ML) between the measurements.

TABLE 1

| Polymer from Example | Addition of TETD to the degassed latex | Addition of nDBA (% by weight, relative to polymer) | ML - 4 (ME) immediately | after 6 days 70° C. | 12 days 70° C. | $\Delta$ML (ME) |
|---|---|---|---|---|---|---|
| 1 | 0 | 0 | 73 | 88 | 97 | 24 |
| 1 | 0,05 | 0,005 | 69 | 70 | 72 | 3 |
| 1 | 0,2 | 0,002 | 67 | 66 | 68 | 1 |
| 2 | 0 | 0 | 76 | 80 | 87 | 11 |
| 2 | 0,1 | 0 | 72 | 72 | 74 | 2 |
| 3 | 0 | 0 | 70 | 75 | 81 | 11 |
| 3 | 0,1 | 0 | 68 | 70 | 74 | 6 |

EXAMPLES 5–7

Preparation of polychloroprene as raw materials for adhesives.

The polymerization is carried out as in Example 1 at +10° C. in the presence of the following amounts of xanthogen disulphide (total amount) (5) 65 g, (6) 61 g, (7) 33 g.

As activator solution, a 1% by weight aqueous sodium dithionite solution is employed in place of the formamidinesulphinic acid.

The work-up is carried out analogously to Example 1.

Alteration of the solution viscosity of polychloroprene adhesive.

2.5 g of the polymer are dissolved in 47.5 of toluene and conditioned for 1 hour at 23° C. in a waterbath, and the viscosity is subsequently measured in a Brookfield LVI viscosimeter with adapter according to DIN 53 019.

The solution viscosity is determined for freshly prepared polymer and for polymer aged at 70° C. in a drying stove. The results are recorded in Table 2.

TABLE 2

| Polymer from Example | Addition of TETD to the non-degassed latex | nDBA | Addition of TETD to the degassed latex | Solution viscosity immediately (cP) | Solution viscosity 6 days at 70° C. (cP) |
|---|---|---|---|---|---|
| 5* | 0 | 0 | 0 | 72 | 114 |
| 5 | 0,1 | 0,01 | 0,1 | 64 | 66 |
| 5 | 0 | 0 | 0,2 | 65 | 68 |
| 6* | 0 | 0 | 0 | 70 | 93 |
| 6 | 0 | 0 | 0,1 | 66 | 68 |
| 6 | 0 | 0 | 0,2 | 66 | 66 |
| 6 | 0 | 0 | 0,5 | 65 | 61 |
| 6 | 0,05 | 0,005 | 0,2 | 64 | 61 |
| 7* | 0 | 0 | 0 | 77 | 102 |
| 7 | 0 | 0 | 0,1 | 74 | 78 |

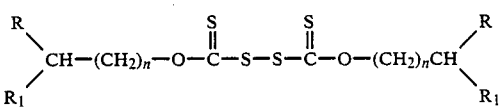

in which n denotes 0 to 4,

R and $R_1$, independently of one another, denote hydrogen, $C_1$-$C_6$-alkyl, $C_5$-$C_8$-cycloalkyl or, together with the CH group, denote an oxygen-containing heterocyclic ring system having 5-8 ring members, which is unsubstituted, mono-, di- or trisubstituted by $C_1$-$C_4$-alkyl, with the proviso that the xanthogen disulphide contains less than 2% by weight, based on xanthogen disulphide, of free sulphur as the single sulphur source, and working up the polymer suspension to the solid rubber, characterized in that from $2 \times 10^{-5}$ to $3 \times 10^{-3}$ mol per 100 g of monomers of tetra($C_1$—$C_4$)alkylthiuram disulphide is added after the end of the polymerization.

2. Process according to claim 1, characterized in that the tetra($C_1$-$C_4$)alkylthiuram disulphide is used in a quantity of from $10^{-4}$ to $1 \times 5 - 10^{-3}$ mol per 100 g of monomers to be polymerized.

* * * * *

What we claim is:

1. Process for the preparation of polychloroprene by aqueous emulsion polymerization of chloroprene and from 0 to 20% by weight, based on the total quantity of monomer to be polymerized, of monomers copolymerizable with chloroprene, in the presence of an effective amount of polymerization initiator and from 0.3 to 5 mmol per 100 g of monomers of xanthogen disulphide corresponding to the formula